July 5, 1932.  N. J. DZIEDZIC  1,866,510
MEAT PRESS
Filed Jan. 24, 1931   3 Sheets-Sheet 1

Nicholas Joseph Dziedzic
INVENTOR

BY Foy W. Johns
ATTORNEY

WITNESS-

Patented July 5, 1932

1,866,510

UNITED STATES PATENT OFFICE

NICHOLAS JOSEPH DZIEDZIC, OF CHICAGO, ILLINOIS, ASSIGNOR TO SWIFT AND COMPANY, OF CHICAGO, ILLINOIS, A CORPORATION OF ILLINOIS

MEAT PRESS

Application filed January 24, 1931. Serial No. 510,867.

My invention relates to means for producing marketable packages of comminuted food products, such as the type of ground beef commonly called hamburger steak.

One of the objects of my invention is to provide an inexpensive simple device for producing cakes of hamburger steak or other comminuted food products.

Other objects of my invention will be apparent from the description which follows and the claim hereinafter made.

In the accompanying drawings which form a part of this specification, similar numerals of reference refer to similar parts in the several figures.

Figure 1:
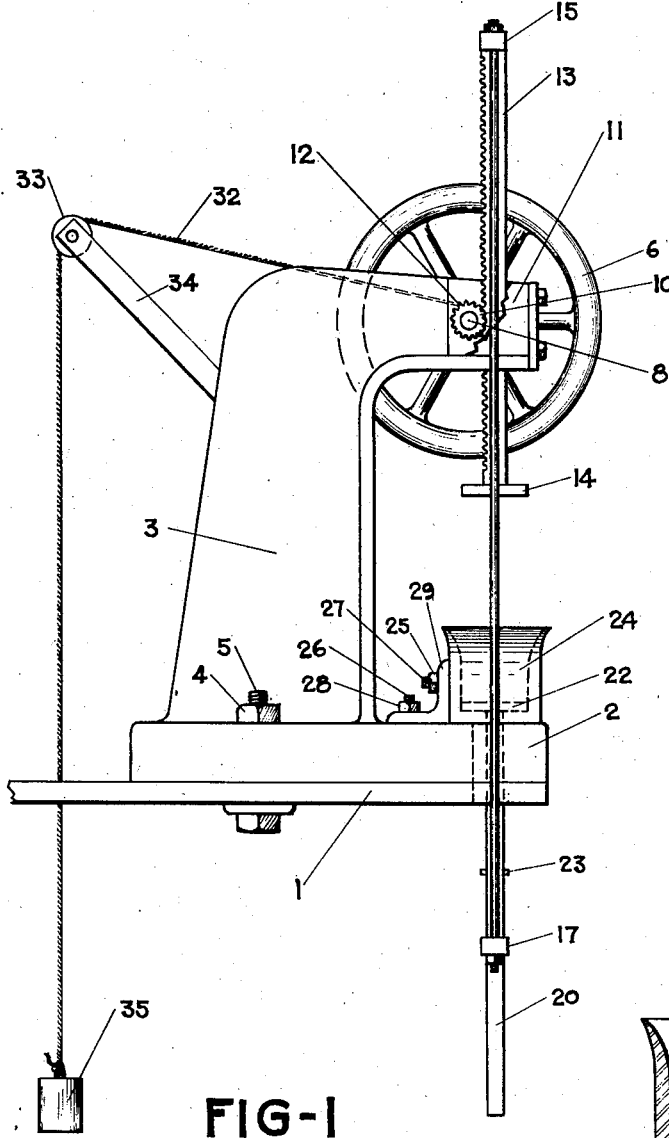
Figure 1 shows a side view of a device designed to be operated by hand-power.
Figure 2:
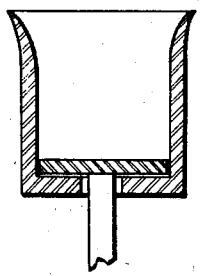
Figure 2 is a sectional detail of the compression box shown in Figure 1.
Figure 3:
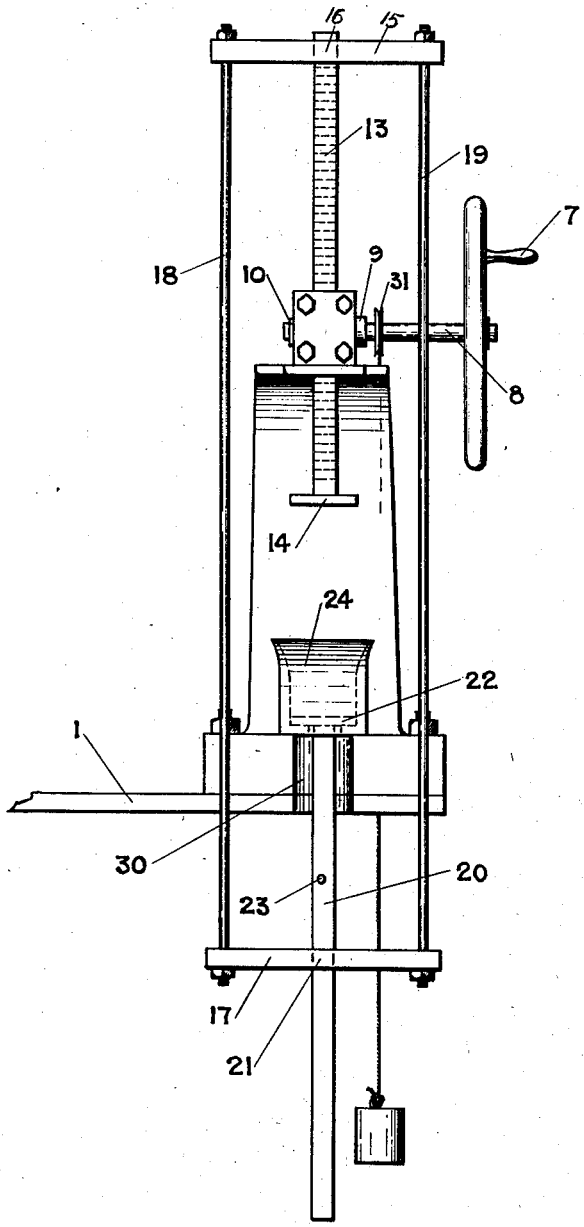
Figure 3 is a front view of the device.
Figure 4:
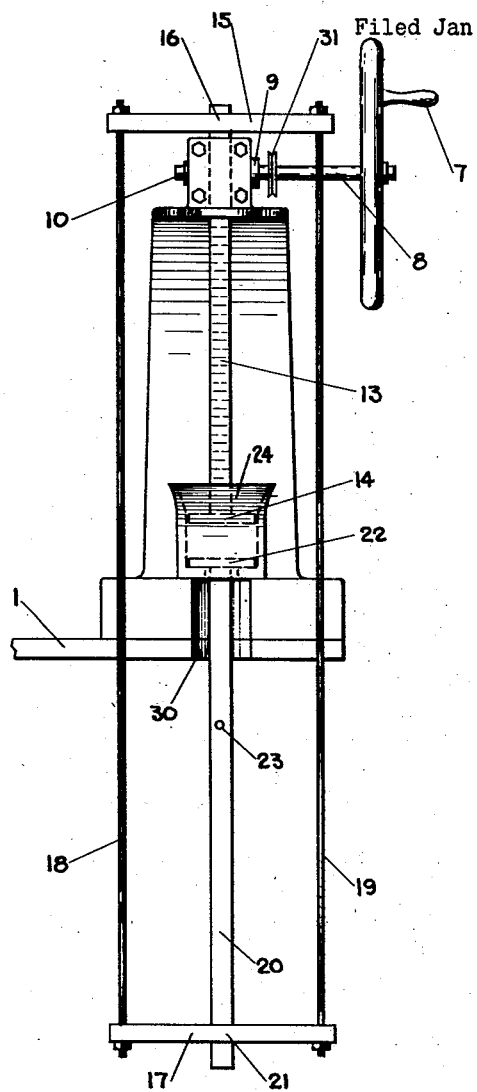
Figure 4 is a front view showing the device in the compression position.
Figure 5:
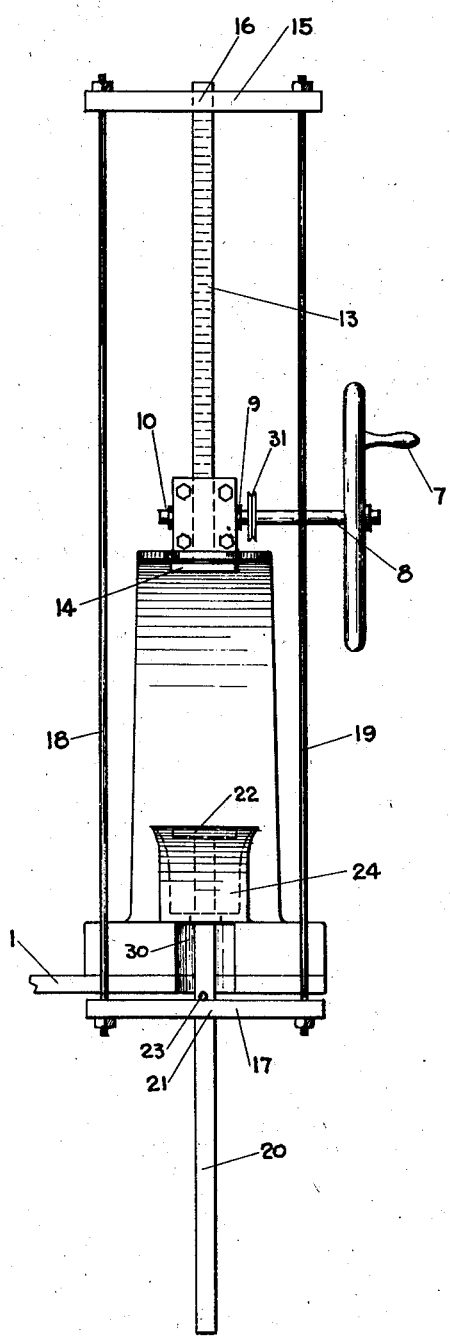
Figure 5 is a front view showing the device in the discharge position.

Referring now to Figure 1 which shows the device mounted on a table as 1: The device consists of a foundation platform 2 and an I-beam arm 3 which is secured to platform 2 by nut 4 and bolt 5, the arm 3 having a laterally extending portion at its upper end. Wheel 6 is provided with a handle 7 and is axially mounted on shaft 8 journaled at 9 and 10. The casing 11 is broken away in Figure 1 to show the gear 12 which meshes with the teeth on rod 13. Rod 13 is provided with plate 14 and is fixed to bar 15 at 16. Bar 17 is connected to bar 15 by rods 18 and 19; rod 20 passes through bar 17 at 21 and is provided with plate 22 and pin 23. Rods 18 and 19 connected by the upper and lower bars 15 and 17, respectively, constitute a slidable frame which carries the rack bar 13. Compression box 24 is mounted on foundation 2 by angle plate 25 secured with bolts 26 and 27 and nuts 28 and 29. An opening 30 adaptable to permit the vertical movement of rod 20 passes through the table 1 platform 2 and box 24; reel 31 is mounted on shaft 8 to take up line 32 which passes over pulley 33 mounted on arm 34 by which line 32 is suspended to counterweight 35. Power is applied to the handle 7 turning gear 12 through wheel 6 and shaft 8. While the device is in the position as shown in Figure 1 and 3 the comminuted product is placed in compression box 24. It will be noted that in this position plate 22 is flush with the bottom of box 24. By revolving the gear 12 as already described, rod 13 causes the entire system consisting of rod 13, bars 15 and 17, rods 18 and 19, to move downward bringing plate 14 in contact with the top of the product to be compressed. Sufficient pressure is applied to compress the product and the motion of gear 12 is reversed causing plate 14 to again pass into the open position and causing bar 17 to contact with pin 23, thus forcing upward plate 22 to permit the removal of the product. Position of the parts will be more readily understood by a reference to Figures 4 and 5. Figure 4, showing the device in the closed or compressed position, and Figure 5 showing the device in the open or discharge position. Figure 3 shows the device in the filling position after rod 17 has passed free of pin 23 permitting plate 22 to rest on the bottom of compression box 24.

My invention is especially adaptable for the production of hamburger steak, such as is produced in accordance with an invention of Grover Ralph Henney and Charles Taylor Walter, described in their co-pending application for patent entitled "Preparation of frozen meat and the like," Serial No. 511,644 filed Jan. 27, 1931. However, it is understood that my device may be adapted for use in the production of other comminuted products.

It will be seen that my invention permits the production of clean-cut cakes of comminuted frozen food product of such mechanical strength as to withstand ordinary handling, especially when treated according to the teachings of Henney and Walter in their hereinbefore mentioned co-pending application, without unduly compressing the product.

It is understood that changes may be made in the design of my press without departing from the spirit of my invention, as defined in the following claim.

I claim:

A meat press comprising a support, a stationary compression box thereon having fixed walls and a fixed bottom, there being openings in the bottom of the box and support, a horizontal meat ejecting plate arranged within the box and supported upon the fixed bottom thereof, a rod depending from the meat ejecting plate and passing loosely through the openings of the box and support and provided below the same with a projecting pin, an arm rising from the support and having a casing at its upper end, a rack bar slidable in the casing and provided at its lower end with a horizontal plate arranged to enter the compression box for compressing meat therein, a shaft mounted in the casing, a gear in the casing secured to the shaft and meshing with the rack bar, an upper cross bar carried by the rack bar, a lower cross bar located below the support and having an opening through which the depending rod of the plate passes, side rods connecting the upper and lower cross bars and passing through the support, and means associated with the shaft to impart rotary movement thereto for operating the rack bar and the meat ejecting plate.

Signed at Chicago, Illinois, this 22nd day of January, A. D., 1931.

NICHOLAS JOSEPH DZIEDZIC.